United States Patent
Young et al.

(10) Patent No.: US 11,548,798 B2
(45) Date of Patent: Jan. 10, 2023

(54) COMPRESSIBLE FOAM ELECTRODE

(71) Applicant: UCHICAGO ARGONNE, LLC, Chicago, IL (US)

(72) Inventors: Matthias John Young, Lemont, IL (US); Edward F. Barry, Chicago, IL (US); Jeffrey W. Elam, Elmhurst, IL (US)

(73) Assignee: UChicago Argonne, LLC, Chicago, IL (US)

( * ) Notice: Subject to any disclaimer, the term of this patent is extended or adjusted under 35 U.S.C. 154(b) by 565 days.

(21) Appl. No.: 16/392,461

(22) Filed: Apr. 23, 2019

(65) Prior Publication Data
US 2020/0339446 A1    Oct. 29, 2020

(51) Int. Cl.
| | |
|---|---|
| C02F 1/469 | (2006.01) |
| C02F 1/461 | (2006.01) |
| C02F 103/08 | (2006.01) |
| H01B 1/22 | (2006.01) |
| C25B 11/031 | (2021.01) |
| C25B 11/051 | (2021.01) |
| C25B 11/055 | (2021.01) |
| C25B 11/073 | (2021.01) |

(52) U.S. Cl.
CPC ........ C02F 1/4691 (2013.01); C02F 1/46109 (2013.01); C25B 11/031 (2021.01); C25B 11/051 (2021.01); C25B 11/055 (2021.01); C25B 11/073 (2021.01); H01B 1/22 (2013.01); C02F 2001/46138 (2013.01); C02F 2001/46161 (2013.01); C02F 2103/08 (2013.01)

(58) Field of Classification Search
CPC .................................................. C02F 1/4691
See application file for complete search history.

(56) References Cited

U.S. PATENT DOCUMENTS

| | | |
|---|---|---|
| 3,617,552 A | 11/1971 | Will et al. |
| 4,744,889 A | 5/1988 | Kruyer |

(Continued)

FOREIGN PATENT DOCUMENTS

| | | | |
|---|---|---|---|
| WO | WO-2006/033924 | 3/2006 | |
| WO | WO-2011/138583 A1 | 11/2011 | |
| WO | WO-2015076438 A1 * | 5/2015 | ........... C25B 11/043 |

OTHER PUBLICATIONS

Afshar & Cadien, "Growth mechanism of atomic layer deposition of zinc oxide: A density functional theory approach," Applied Physics Letters 103(25), 251906, 6 pages (2013).

(Continued)

*Primary Examiner* — Salil Jain
(74) *Attorney, Agent, or Firm* — Foley & Lardner LLP

(57) ABSTRACT

A foam electrode comprising surface treatment by the steps of: 1) impregnating soft compressible polymeric foams with a conductive coating via sequential infiltration synthesis and 2) functionalizing the chemically altered voids with an ultrathin redox coating to enhance capacitive deionization (CDI). The redox coating will allow treated foam to absorb ions under the application of a bias, and mechanical compression/decompression. The CDI apparatus uses the void volume of the foam in the uncompressed state to flow liquids through it while the compressed state is used to enhance desalination by limiting the diffusion pathways for the ions to find an adsorption surface.

19 Claims, 8 Drawing Sheets

(56) References Cited

U.S. PATENT DOCUMENTS

| | | | |
|---|---|---|---|
| 4,889,542 | A | 12/1989 | Hayes |
| 5,133,881 | A | 7/1992 | Miller et al. |
| 5,645,733 | A | 7/1997 | Hobson |
| 5,973,068 | A | 10/1999 | Yamaya et al. |
| 6,326,326 | B1 | 12/2001 | Feng et al. |
| 6,723,595 | B2 | 4/2004 | Park |
| 8,980,418 | B2 | 3/2015 | Darling et al. |
| 9,103,086 | B2 | 8/2015 | Cantrell et al. |
| 9,719,226 | B2 | 8/2017 | Riedel |
| 2002/0005360 | A1 | 1/2002 | Haug et al. |
| 2002/0043216 | A1 | 4/2002 | Hwang et al. |
| 2002/0144595 | A1 | 10/2002 | Wang et al. |
| 2003/0082412 | A1 | 5/2003 | Fukuda et al. |
| 2005/0081907 | A1 | 4/2005 | Lewis et al. |
| 2006/0048938 | A1 | 3/2006 | Kalman |
| 2006/0088666 | A1 | 4/2006 | Kobrin et al. |
| 2008/0073288 | A1* | 3/2008 | Fan .................. C02F 1/4691 204/554 |
| 2008/0107809 | A1 | 5/2008 | Wu et al. |
| 2008/0286448 | A1 | 11/2008 | Elam et al. |
| 2009/0111703 | A1 | 4/2009 | Gopalan |
| 2009/0297868 | A1 | 12/2009 | Ito et al. |
| 2009/0304920 | A1 | 12/2009 | Elam et al. |
| 2010/0003406 | A1 | 1/2010 | Lam et al. |
| 2010/0080903 | A1 | 4/2010 | Tamitsuji et al. |
| 2011/0042301 | A1 | 2/2011 | Zhang et al. |
| 2011/0056886 | A1 | 3/2011 | De Luca |
| 2011/0168454 | A1 | 7/2011 | Keshavan et al. |
| 2012/0046421 | A1 | 2/2012 | Darling et al. |
| 2012/0171403 | A1 | 7/2012 | Dodge |
| 2013/0059123 | A1 | 3/2013 | Wang et al. |
| 2013/0095996 | A1 | 4/2013 | Buelow et al. |
| 2014/0370259 | A1 | 12/2014 | Edwards et al. |
| 2014/0371060 | A1 | 12/2014 | Smith et al. |
| 2017/0025658 | A1 | 1/2017 | Shi et al. |
| 2017/0157534 | A1 | 6/2017 | Curtis et al. |
| 2017/0166456 | A1 | 6/2017 | Darling et al. |
| 2017/0304778 | A1 | 10/2017 | Ye et al. |
| 2018/0303941 | A1 | 10/2018 | Ameer et al. |
| 2018/0342176 | A1 | 11/2018 | Califorrniaa |
| 2020/0062600 | A1 | 2/2020 | Kidambi et al. |

OTHER PUBLICATIONS

Kowalik, et al., "Extra-Low Temperature Growth of ZnO by Atomic Layer Deposition with Diethylzinc Precursor," Acta Physica Polonica A 112(2), pp. 401-406 (2007).
"Oleo Sponge," Argonne National Laboratory, 1 page (2018).
Barry, et al., "Advanced oil sorbents using sequential infiltration synthesis," Journal of Materials Chemistry A 5, pp. 2929-2935 (2017).
Buluswar, et al., "50 Breakthroughs: Critical scientific and technological advances needed for sustainable global development," Institute for Transformative Technologies, Lawrence Berkeley National Lab., 22 pages (2014).
Choi, et al., "Effects of substrate conductivity on cell morphogenesis and proliferation using tailored, atomic layer deposition-grown ZnO thin films," Scientific Reports 5, 9974, 9 pages (2015).
Fabreguette, et al., "Quartz crystal microbalance study of tungsten atomic layer deposition using WF6 and Si2H6," Thin Solid Films 488(1-2), pp. 103-110 (2005).
Frackowiak & Beguin, "Carbon materials for the electrochemical storage of energy in capacitors," Carbon 39(6), pp. 937-950 (2011).
George, "Atomic layer deposition: an overview," Chemical Reviews 110(1), pp. 111-131 (2010).
Hall, et al., "Energy storage in electrochemical capacitors: designing functional materials to improve performance," Energy & Environmental Science 3, pp. 1238-1251 (2010).
Hao, et al., "Oxygen Vacancies Lead to Loss of Domain Order, Particle Fracture, and Rapid Capacity Fade in Lithium Manganospinel (LiMn2O4) Batteries," ACS Applied Materials & Interfaces 6(14), p. 10849-10857 (2014).

Janotti & Van De Walle, Fundamentals of zinc oxide as a semiconductor, Reports on Progress in Physics 72(12), 29 pages (2009).
Kim, et al., "A development of high power activated carbon using the KOH activation of soft carbon series cokes," Transactions on Electrical and Electronic Materials 15(2), pp. 81-86 (2014).
Macdiarmid, et al., "Polyaniline: a new concept in conducting polymers," Synthetic Metals 18(1-3), pp. 285-290 (1987).
Mcneill, et al., "Electronic Conduction in Polymers. I. The Chemical Structure of Polypyrrole," Australian Journal of Chemistry 16(6), pp. 1056-1075 (1963).
Naveen, et al., "Applications of conducting polymer composites to electrochemical sensors: A review," Applied Materials Today 9, pp. 419-433 (2017).
Pasta, et al., "A Desalination Battery," Nano Letters 12(2), pp. 839-843 (2012).
Porada, et al., "Review on the science and technology of water desalination by capacitive deionization," Progress in Materials Science 58(8), pp. 1388-1442 (2013).
Simon & Gogotsi, "Materials for electrochemical capacitors," Nature Materials 7, pp. 845-854 (2008).
Song, et al., "Anomalous Pseudocapacitive Behavior of a Nanostructured, Mixed-Valent Manganese Oxide Film for Electrical Energy Storage," Nano Letters 12(7), pp. 3483-3490 (2012).
Sugimoto, et al., "Charge storage mechanism of nanostructured anhydrous and hydrous ruthenium-based oxides," Electrochimica Acta 52(4), pp. 1742-1748 (2006).
Suss, et al., "Water desalination via capacitive deionization: what is it and what can we expect from it?," Energy & Environmental Science 8, pp. 2296-2319 (2015).
Zang, et al., "Well-Aligned Cone-Shaped Nanostructure of Polypyrrole/RuO2 and Its Electrochemical Supercapacitor," The Journal of Physical Chemistry C 112(38), pp. 14843-14847 (2008).
Bico, et al., "Wetting of textured surfaces," Colloids and Surfaces A: Physicochemical and Engineering Aspects 206(1-3), pp. 41-46 (2002).
Bobji, et al., "Underwater sustainability of the 'Cassie' state of wetting," Langmuir 25(20), pp. 12120-12126 (2009).
Calcagnile, et al., "Magnetically Driven Floating Foams for the Removal of Oil Contaminants from Water," ACS Nano 6(6), pp. 5413-5419 (2012).
Cao, et al., "Hydrophobic/Hydrophilic Cooperative Janus System for Enhancement of Fog Collection," Small 11(34), pp. 4379-4384 (2015).
Chen & Xu, "Mineral-Coated Polymer Membranes with Superhydrophilicity and Underwater Superoleophobicity for Effective Oil/Water Separation," Scientific Reports 3, 2776, 6 pages (2013).
Chen, et al., "Bio-inspired CaCO3 coating for superhydrophilic hybrid membranes with high water permeability," Journal of Materials Chemistry 22, pp. 22727-22733 (2012).
Chen, et al., "Enhancing the hydrophilicity and water permeability of polypropylene membranes by nitric acid activation and metal oxide deposition," Journal of Membrane Science 487, pp. 109-116 (2015).
Cheryan & Rajagopalan, "Membrane processing of oily streams. Wastewater treatment and waste reduction," Journal of Membrane Science 151 (1), pp. 13-28 (1998).
Dillon, et al., "Surface chemistry of Al2O3 deposition using Al(CH3)3 and H2O in a binary reaction sequence," Surface Science 322 (1-3), pp. 230-242 (1995).
Dorrer & Ruhe, "Superaerophobicity: Repellence of air bubbles from submerged, surface-engineered silicon substrates," Langmuir 28(42), pp. 14968-14973 (2012).
Dudchenko, et al., "Coupling Underwater Superoleophobic Membranes with Magnetic Pickering Emulsions for Fouling-Free Separation of Crude Oil/Water Mixtures: An Experimental and Theoretical Study," ACS Nano 9(10), pp. 9930-9941 (2015).
Elam, et al., "Conformal coating on ultrahigh-aspect-ratio nanopores of anodic alumina by atomic layer deposition," Chemistry of Materials 15(18), pp. 3507-3517 (2003).
Elam, et al., "Spatially controlled atomic layer deposition in porous materials," Applied Physics Letters 91, pp. 177-184 (2007).

(56) References Cited

OTHER PUBLICATIONS

Fakhru'l-Razi, et al., "Review of technologies for oil and gas produced water treatment," Journal of Hazardous Materials 170(2-3), pp. 530-551 (2009).
Gao, et al., "A Robust Polyionized Hydrogel with an Unprecedented Underwater Anti-Crude-Oil-Adhesion Property," Advanced Materials 28(26), pp. 5307-5314 (2016).
Ge, et al., "Pumping through Porous Hydrophobic/Oleophilic Materials: An Alternative Technology for Oil Spill Remediation," Angewandte Chemie 53(14), pp. 3612-3616 (2014).
Guo, et al., "Robust Underwater Oil-Repellent Material Inspired by Columnar Nacre," Advanced Materials 28(38), pp. 8505-8510 (2016).
Hou, et al., "Biocatalytic Janus membranes for CO2 removal utilizing carbonic anhydrase," Journal of Materials Chemistry A 3, pp. 17032-17041 (2015).
Hu, et al.,. "An ultrathin bilayer membrane with asymmetric wettability for pressure responsive oil/water emulsion separation," J. Mater. Chem. A, 3, pp. 23477-23482 (2015).
Huang & Wang, "A Simple Nanocellulose Coating for Self-Cleaning upon Water Action: Molecular Design of Stable Surface Hydrophilicity," Angewandte Chemie International Edition 56(31), pp. 9053-9057 (2017).
Huang, et al., "Novel Janus Membrane for Membrane Distillation with Simultaneous Fouling and Wetting Resistance," Environmental Sciences Technology 51(22), pp. 13304-13310 (2017).
International Search Report and Written Opinion for PCT/US2017/041223 dated Sep. 28, 2017, 8 pages.
Jung, et al., "Improved functionality of lithium-ion batteries enabled by atomic layer deposition on the porous microstructure of polymer separators and coating electrodes," Advanced Energy Materials 2(8), pp. 1022-1027 (2012).
Jur, et al., "Temperature-dependent subsurface growth during atomic layer deposition on polypropylene and cellulose fibers," Langmuir 26(11), pp. 8239-8244 (2010).
Keshavarz, et al., "Enhancing oil removal from water by immobilizing multi-wall carbon nanotubes on the surface of polyurethane foam," Journal of Environmental Management 157, pp. 279-286 (2015).
Kota, et al., "Hygro-responsive membranes for effective oil-water separation," Nature Communications 3, 1025, 8 pages (2012).
Kota, et al., "The design and applications of superomniphobic surfaces," NPG Asia Materials 6, e109, 16 pages (2014).
Lam, et al., "A Chemically Patterned Microfluidic Paper-based Analytical Device (C-uPAD) for Point-of-Care Diagnostics," Scientific Reports 7, 1188, 10 pages (2017).
Lee, et al., "An Alternative Route Towards Metal-Polymer Hybrid Materials Prepared by Vapor-Phase Processing," Advanced Functional Materials 21(16), pp. 3047-3055 (2011).
Lee, et al., "Conformal Nitrogen-Doped TiO2 Photocatalytic Coatings for Sunlight-Activated Membranes," Advanced Sustainable Systems 1(1-2), 1600041, 23 pages (2017).
Lee, et al., "Membrane materials for water purification: design, development, and application," Environmental Science: Water Research & Technology 2, pp. 17-42 (2016).
Lee, et al., "Nanofluidic transport governed by the liquid/vapour interface," Nature Nanotechnology 9, pp. 317-323 (2014).
Li, et al., "Modification of ceramic membranes for pore structure tailoring: The atomic layer deposition route," Journal of Membrane Science 397-398, pp. 17-23 (2012).
Li, et al., "Precise pore size tuning and surface modifications of polymeric membranes using the atomic layer deposition technique," Journal of Membrane Science 385-386, pp. 1-9 (2011).
Li, et al., "Under-Water Superaerophobic Pine-Shaped Pt Nanoarray Electrode for Ultrahigh-Performance Hydrogen Evolution," Advanced Functional Materials 25(11), pp. 1737-1744 (2015).
Liu, et al., "Clam's Shell Inspired High-Energy Inorganic Coatings with Underwater Low Adhesive Superoleophobicity," Advanced Materials 24(25), pp. 3401-3405 (2012).
Oh, et al., "Janus-Faced, Dual-Conductive/Chemically Active Battery Separator Membranes," Advanced Functional Materials 26(39), pp. 7074-7083 (2016).
Ozkaya, et al., "Combined in situ XPS and UHV-chemical force microscopy (CFM) studies of the plasma induced surface oxidation of polypropylene," Plasma Processes and Polymers 11(3), pp. 256-262 (2014).
Parsons, et al., "Mechanisms and reactions during atomic layer deposition on polymers," Coordination Chemistry Reviews 257 (23-24), pp. 3323-3331 (2013).
Peng, et al., "Janus separator of polypropylene-supported cellular graphene framework for sulfur cathodes with high utilization in lithium-sulfur batteries," Advanced Science 3(1), pp. 1-11 (2015).
Peng, et al., "Theoretical specific capacitance based on charge storage mechanisms of conducting polymers: Comment on 'Vertically oriented arrays of polyaniline nanorods and their super electrochemical properties'," Chemical Communications 47, pp. 4105-4107 (2011).
Pi, et al., "Polypropylene microfiltration membranes modified with TiO2 nanoparticles for surface wettability and antifouling property," Journal of Membrane Science 500, pp. 8-15 (2016).
Remillard, et al., "A direct comparison of flow-by and flow-through capacitive deionization," Desalination 444, pp. 169-177 (2018).
Ren, et al., "A single-layer Janus membrane with dual gradient conical micropore arrays for selfdriving fog collection," Journal of Materials Chemistry A 5, pp. 18403-18408 (2017).
Sasaki, et al., "Asymmetric Superhydrophobic/Superhydrophilic Cotton Fabrics Designed by Spraying Polymer and Nanoparticles," ACS Applied Materials & Interfaces 8(1), pp. 651-659 (2016).
Steele, et al., "Inherently Superoleophobic Nanocomposite Coatings by Spray Atomization," Nano Letters 9(1), pp. 501-505 (2009).
Sugimoto, et al., "Preparation of Ruthenic Acid Nanosheets and Utilization of Its Interlayer Surface for Electrochemical Energy Storage," Angewandte Chemie International Edition 42(34), pp. 4092-4096 (2003).
Tao, et al., "An Intelligent Superwetting PVDF Membrane Showing Switchable Transport Performance for Oil/Water Separation," Advanced Materials 26(18), pp. 2943-2948 (2014).
Tian, et al., "Droplet and Fluid Gating by Biomimetic Janus Membranes," Advanced Functional Materials 24(38), pp. 6023-6028 (2014).
Toupin, et al., "Charge Storage Mechanism of MnO2 Electrode Used in Aqueous Electrochemical Capacitor," Chemistry of Materials 16(16), pp. 3184-3190 (2004).
Ueda, et al., "Effects of aeration on suction pressure in a submerged membrane bioreactor," Water Research 31(3), pp. 489-494 (1997).
Vaha-Nissi, et al., "Growth of thin Al2O3 films on biaxially oriented polymer films by atomic layer deposition," Thin Solid Films 522, pp. 50-57 (2012).
Wang, et al., "Directional water-transfer through fabrics induced by asymmetric wettability," Journal of Materials Chemistry 20, 7938 (2010).
Wang, et al., "Extremely Efficient and Recyclable Absorbents for Oily Pollutants Enabled by Ultrathin-Layered Functionalization," ACS Applied Materials & Interfaces 6(21), pp. 18816-18823 (2014).
Wang, et al., "PVDF membranes with simultaneously enhanced permeability and selectivity by breaking the tradeoff effect via atomic layer deposition of TiO2," Journal of Membrane Science 442, pp. 57-64 (2013).
Wang, et al., "Rapid and Efficient Separation of Oil from Oil-in-Water Emulsions Using a Janus Cotton Fabric," Angewandte Chemie International Edition 55(4), pp. 1291-1294 (2016).
Wang, et al., "Simply realizing 'water diode' Janus membranes for multifunctional smart applications," Materials Horizons 4, pp. 701-708 (2017).
Wang, et al., "Universal Janus Filters for the Rapid Separation of Oil from Emulsions Stabilized by Ionic or Nonionic Surfactants," Angewandte Chemie International Edition 56(42), pp. 12892-12897 (2017).
Wen, et al., "Zeolite-coated mesh film for efficient oil-water separation," Chemical Science 4, pp. 591-595 (2013).

(56) References Cited

OTHER PUBLICATIONS

Wu, et al., "Janus Membranes with Opposing Surface Wettability Enabling Oil-to-Water and Water-to-Oil Emulsification," ACS Applied Materials & Interfaces 9(6), pp. 5062-5066 (2017).
Wu, et al., "Unidirectional water-penetration composite fibrous film via electrospinning," Soft Matter 8, 5996 (2012).
Xu, et al., "Atomic layer deposition of alumina on porous polytetrafluoroethylene membranes for enhanced hydrophilicity and separation performances," Journal of Membrane Science 415-416, pp. 435-443 (2012).
Xu, et al., "Hydrophilization of porous polypropylene membranes by atomic layer deposition of TiO2 for simultaneously improved permeability and selectivity," Journal of Membrane Science 448, pp. 215-222 (2013).
Xue, et al., "A Novel Superhydrophilic and Underwater Superoleophobic Hydrogel-Coated Mesh for Oil/Water Separation," Advanced Materials 23(37), pp. 4270-4273 (2011).
Yang, et al., "Janus hollow fiber membrane with a mussel-inspired coating on the lumen surface for direct contact membrane distillation," Journal of Membrane Science 523, pp. 1-7 (2017).
Yang, et al., "Janus Membranes with Asymmetric Wettability for Fine Bubble Aeration," Advanced Materials Interfaces 3(9), pp. 1-5 (2016).
Yang, et al., "Janus Membranes: Exploring Duality for Advanced Separation," Angewandte Chemie International Edition 55(43), pp. 13398-13407 (2016).
Yang, et al., "Mussel-inspired modification of a polymer membrane for ultra-high water permeability and oil-in-water emulsion separation," Journal of Materials Chemistry A 2, pp. 10225-10230 (2014).
Yang, et al., "Paper-Based Microfluidic Devices: Emerging Themes and Applications," Analytical Chemistry 89(1), pp. 71-91 (2017).
Yang, et al., "Polymer membrane with a mineral coating for enhanced curling resistance and surface wettability," Chemical Communications 51, pp. 12779-12782 (2015).
Yang, et al., "Silica-Decorated Polypropylene Microfiltration Membranes with a Mussel-Inspired Intermediate Layer for Oil-in-Water Emulsion Separation," ACS Applied Materials & Interfaces 6(15), pp. 12566-12572 (2014).
Yang, et al., "Surface and interface engineering for organic-inorganic composite membranes," Journal of Materials Chemistry A 4(25), pp. 9716-9729 (2016).
Zhang & Barboiu, "Dynameric asymmetric membranes for directional water transport," Chemical Communications 51, pp. 15925-15927 (2015).
Zhang, et al., "Biomimetic multifunctional nanochannels based on the asymmetric wettability of heterogeneous nanowire membranes," Advanced Materials 26(7), pp. 1071-1075 (2014).
Zhang, et al., "Cupric Phosphate Nanosheets-Wrapped Inorganic Membranes with Superhydrophilic and Outstanding Anticrude Oil-Fouling Property for Oil/Water Separation," ACS Nano 12(1), pp. 795-803 (2018).
Zhang, et al., "Mineralized growth of Janus membrane with asymmetric wetting property for fast separation of a trace of blood," Journal of Materials Chemistry B 5, pp. 4876-4882 (2017).
Zhang, et al., "Nanowire-Haired Inorganic Membranes with Superhydrophilicity and Underwater Ultralow Adhesive Superoleophobicity for High-Efficiency Oil/Water Separation," Advanced Materials 25(30), pp. 4192-4198 (2013).
Zhang, et al., "Salt-Induced Fabrication of Superhydrophilic and Underwater Superoleophobic PAA-g-PVDF Membranes for Effective Separation of Oil-in-Water Emulsions," Angewandte Chemie International Edition 53(3), pp. 856-860 (2014).
Zhang, et al., "Superhydrophobic and Superoleophilic PVDF Membranes for Effective Separation of Water-in-Oil Emulsions with High Flux," Advanced Materials 25(14), pp. 2071-2076 (2013).
Zhao, et al., "Directional Fluid Transport in Thin Porous Materials and its Functional Applications," Small 13(4), pp. 1-22 (2017).
Zheng & Yapa, "Bouyant Velocity of Spherical and Nonspherical Bubbles/Droplets," Journal of Hydraulic Engineering 126(11), pp. 852-854 (2000).
Zhou, et al., "Superphobicity/philicity janus fabrics with switchable, spontaneous, directional transport ability to water and oil fluids," Sci. Rep., 3, pp. 1-6 (2013).

\* cited by examiner

COMPRESSIBLE FOAM ELECTRODE

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to functionalized foam materials and methods of forming the same. Certain embodiments relate to compressible foam electrodes and methods of using same for ion-removal, such as desalination.

BACKGROUND

Capacitive deionization (CDI) has been identified as a cost-effective approach for desalination, particularly for brackish water with up to 0.3 wt % salt. CDI operates on the principle of electrosorption of ions into the electric double layer of high surface area conductive (typically carbon) electrodes. CDI devices are commercially available from a number of domestic and international suppliers; however, industrial adoption of CDI has been hindered by the low energy efficiency of CDI versus reverse osmosis (RO) for higher salinity feedwaters and the high cost of ion exchange membranes used in CDI devices. Further growth necessitates electrode development to improve energy efficiency and eliminate the need for expensive ion exchange membranes. Towards this end, we develop electrodes with high salt sorption capacities, high ion selectivity, and minimal diffusion overpotential. Commercial CDI devices employ high surface area carbon. Carbon is appealing because it is electrically conductive, has high surface area (exceeding 1000 $m^2/g$), and has long cycling stability. However, the gravimetric specific capacitance of carbon is low (10-100 F/g), which requires a greater mass of carbon for appreciable ion removal, leading to thicker (mm+) nanoporous electrodes. Diffusion through these thick nanoporous electrodes limits performance and leads to energy loss from diffusion overpotential.

While much focus has been on improving CDI, traditional materials and devices have faced a tradeoff between capacity (adsorption) and flow-through (free volume). As materials increased in surface area, increasing capacity, the relative free volume and the flow through the material was restricted. Thus, there is a need for a material that overcomes this restriction, providing the benefits of both high capacity and high flow-through.

SUMMARY

One embodiment relates to a method of fabricating a compressible foam electrode. The method comprises providing a foam comprising a base material and coating the base material with a conductive material using sequential infiltration synthesis (SIS) process, which includes at least one cycle of: exposing the foam to a first metal precursor for a first predetermined time and a first partial pressure, the first metal precursor depositing on or infiltrating at least a portion of the base material and binding with the base material, and exposing the foam to a second co-reactant precursor for a second predetermined time and a second partial pressure, the second co-reactant precursor reacting with the first metal precursor, thereby forming the inorganic material on the base material, the inorganic material growing on or infiltrating at least the portion of the base material. The method further comprises functionalizing the inorganic material with a silane coupler and coupling a redox-active material to the foam by the silane coupler.

A capacitive deionization apparatus comprises a first foam electrode, a second foam electrode, and a separator positioned between the first foam electrode and a second foam electrode. The apparatus further includes a water feed inlet and an effluent water outlet associated with the separator. A compression mechanism is provided for controllably compressing at least one of the first foam electrode and the second foam electrode.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
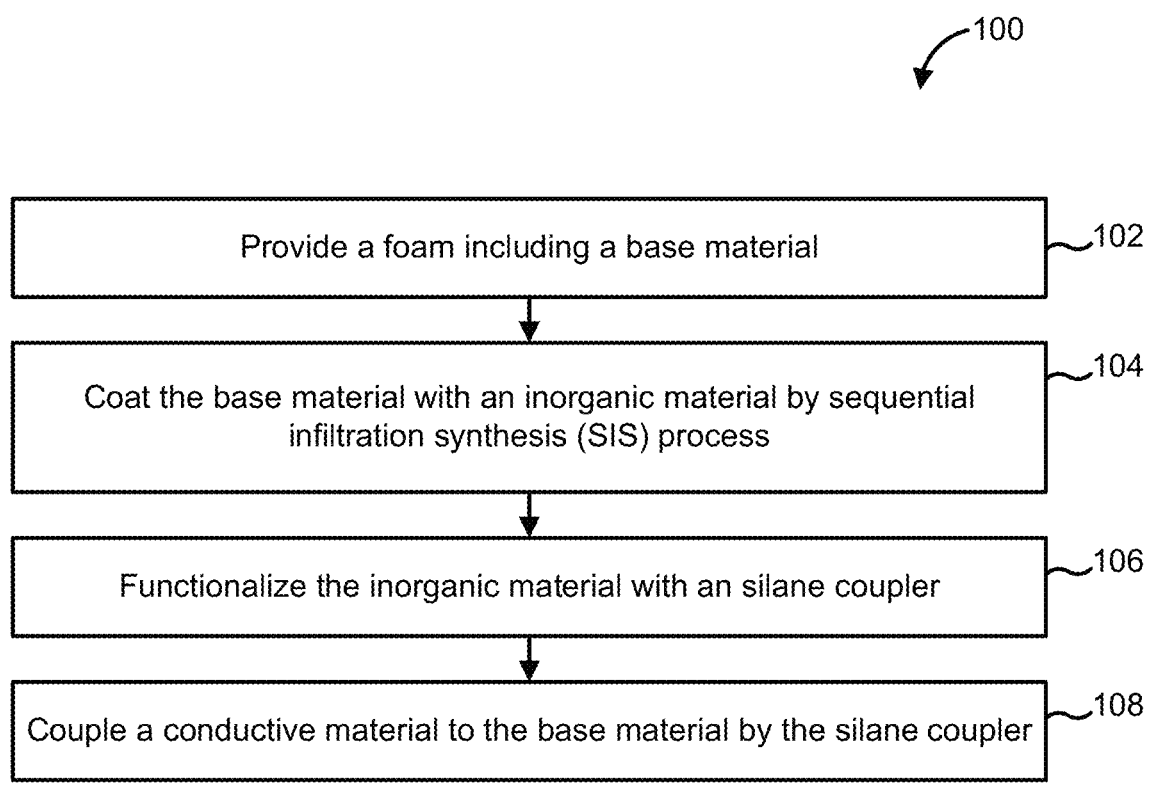
FIG. 1 is a schematic flow diagram of a method for fabricating a conductive foam, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to foams and methods for forming such foams and, in particular to forming compressible foam electrodes using an atomic layer deposition (ALD) and/or SIS process. The compressible foam electrodes can, for example, be used to improve capacitive deionization by using chemically modified low-cost foams as electrodes to enhance ion transport and overcome diffusion problems limiting capacitive deionization. The infiltration into the foam with conductive materials by SIS preserves the foam's mechanical properties while rendering it conductive and leaves it susceptible to subsequent processing.

As shown in FIG. 1, in one embodiment, a method 100 includes providing a foam comprising a base material at 102. The base material can include any suitable material, such as, for example, polyurethane, polyimides, acrylics, polyamides, polyesters, polycarbonates, polyaramides, or any other suitable base material which can be used to form the foam. Similar to some widely known products (e.g., seat cushions and the like), foam has widespread usage because it provides a unique combination of form and function. The selection of foam herein is based on a number of factors including: (i) foam mechanical properties (such as compressibility and the ability to retain its shape after compression) and (ii) foam morphological or geometrical properties (such as surface area or porosity). In both cases, these are distinct advantages to having one set of properties over the other and/or some suitable combination of the two, whereby the relative importance dictates the final selection. For example, high throughput of fluids is enabled by foam with high porosity, a suitable number of binding sites is gained by high surface area, good compressibility would be required for repeated usage, and so on. The surface functionalization scheme itself is amenable to any base foam material, including, for example, polyurethane, polyimides, acrylics, polyamides, polyesters, polycarbonates, polyaramides, or any other suitable base material. These consist of some embodiments wherein the base material is formed from a polymer, which includes one or more carbonyl moieties within some or all of the monomers of the polymer. In particular embodiments, the base material includes polyurethane. In some embodiments, the foam can include a plurality of strands of the base material intermingled, interwoven, or otherwise shaped so as to form the foam (e.g., a foam block, a foam net, a foam pad or any other suitable structure). These individual polymer strands form a porous macrostructure (i.e., the foam). The foam may have a pore size and density selected to tune the surface area of foam relative to the salt ions contained within its internal void volume. In some embodiments, the selected foam is of sufficient porosity (defined as the ratio of free volume versus total volume) to enable high throughput of liquids through it. Such features are also quantified by pores per inch (PPI) and the filament slenderness ratio, equal to the cross-sectional area of the filament divided by its thickness. A selection of foam based on these parameters/properties as starting material could proceed in the following way: (1) estimate the concentration of ions in solution (e.g., brackish water=0.5-30 g/L and ocean water=35 g/L), (2) compute the number of surface sites needed to adsorb one ion per site, (3) determine the size of the electrode (total volume), and (4) compute the desired flow rate (porosity). These numbers should be understood to provide an estimate of the upper bound for the targeted foam surface area, relative to the porosity and thus flow rate. It is important to note that this is one example and that, specifically for CDI, it is not only the surface that gets populated by ions but a layer surrounding the material. In this way the needed surface area would act as an upper bound. That upper bound can proceed lower depending on the materials' surface capacitance by engineering corresponding porosity/surface area to lower and lower values and get higher throughput.

Figure 6:
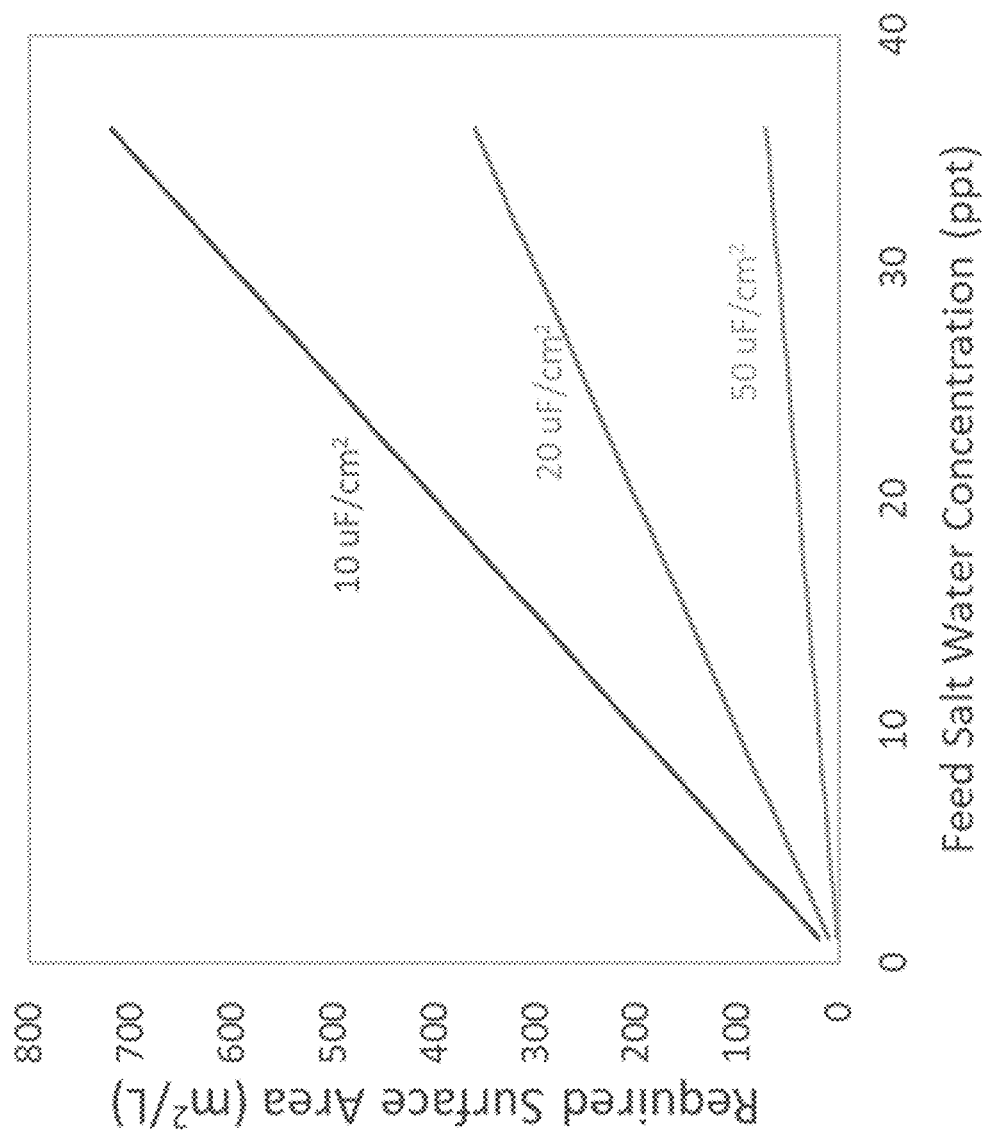
FIG. 6 is a graph of the surface area of foam required to match salt concentration in water.

Depending on the measured specific surface capacitance of a particular coating, the surface area of the foam can be selected to match the target salt concentration of the feed water to be treated. Specific surface capacitances reported in the literature are commonly >10 uF/cm$^2$, so <600 m$^2$/(L void volume) is expected to be required. As depicted in FIG. 6, with a specific surface capacitance of 20 uF/cm$^2$, a surface area of ~300 m$^2$/(L void volume) would be required to remove >30 ppt salt—roughly the salt concentration of ocean water. High surface area carbon electrodes commonly used in CDI have orders of magnitude higher surface area, introducing transport losses and regions of high localized electric field. The lower surface area of foams is a significant advantage over high surface area carbons.

In one embodiment, the base material is infiltrated by a conductive material. In particular embodiments, the conductive material is hydroxyl-rich electrically conductive material. Such a hydroxyl rich conductive material provides an ideal substrate for further modification via silane-based functional agents that have been specifically tailored to the desirable surface chemistry. Electrically conductive chemistries include Pt, Pd, W, Co, and Ru. T<100° C. so as not to melt the polymeric foam, and >100° C. to volatilize precursors with low vapor pressure and overcome kinetic barriers to reaction. Zinc oxide is one of the most viable candidates and is used as a non-limiting example herein. ZnO grown by sequential deposition has high electronic conductivity arising from proton interstitials. In a further embodiment, the deposition is of tungsten and other metal films (e.g., Ru, Pt).

Figure 2:
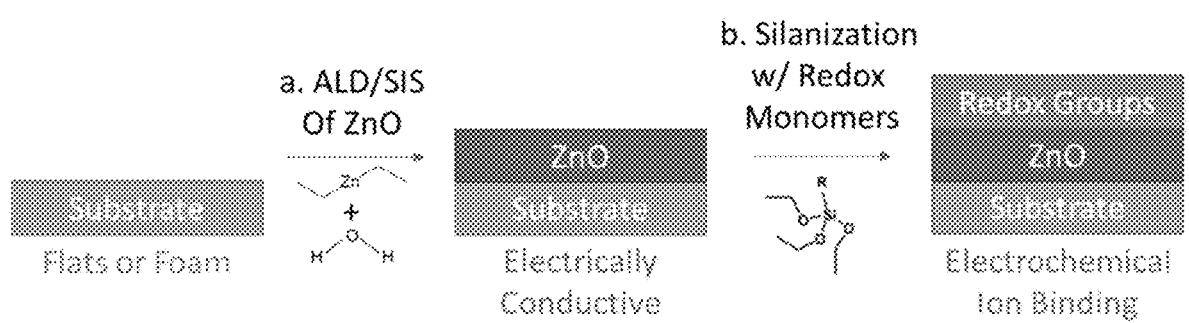
FIG. 2 shows a strategy for functionalization of foam electrodes for enhanced ion removal consisting of imparting electrical conductivity through ZnO coating and grafting of functional monomers using silanization reactions.
Figure 3A:
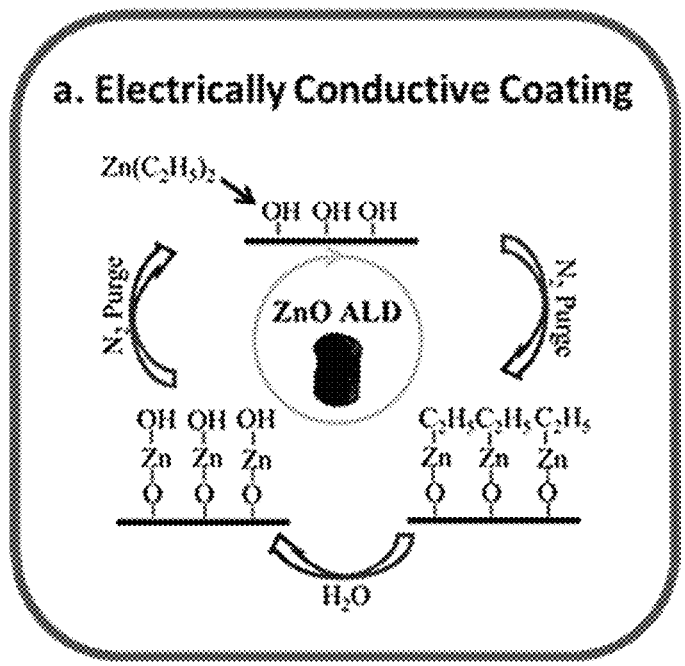
FIGS. 3A-3C show a strategy for functionalization of foam electrodes for enhanced ion removal consisting of imparting electrical conductivity through ZnO coating (FIG. 3A), grafting of functional monomers using silanization reactions (FIG. 3B), and using functional monomers to electrochemically bind ions (FIG. 3C).
Figure 3B:
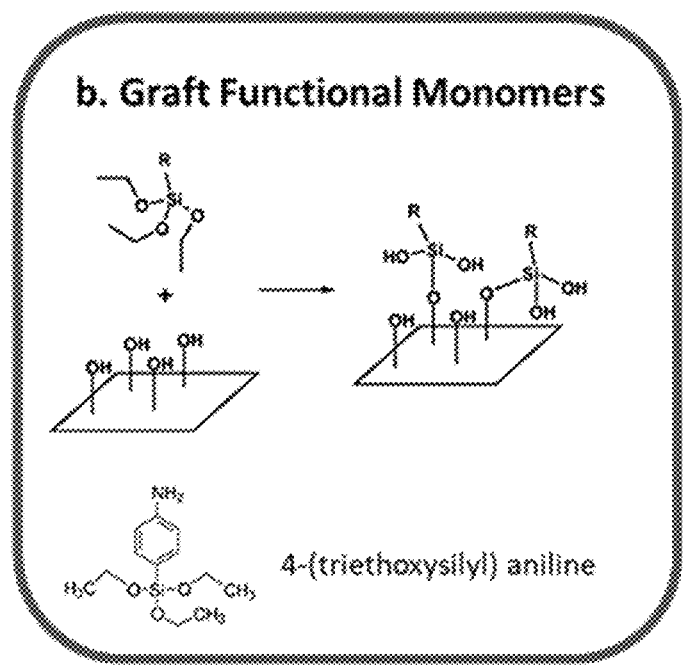
Figure 3C:
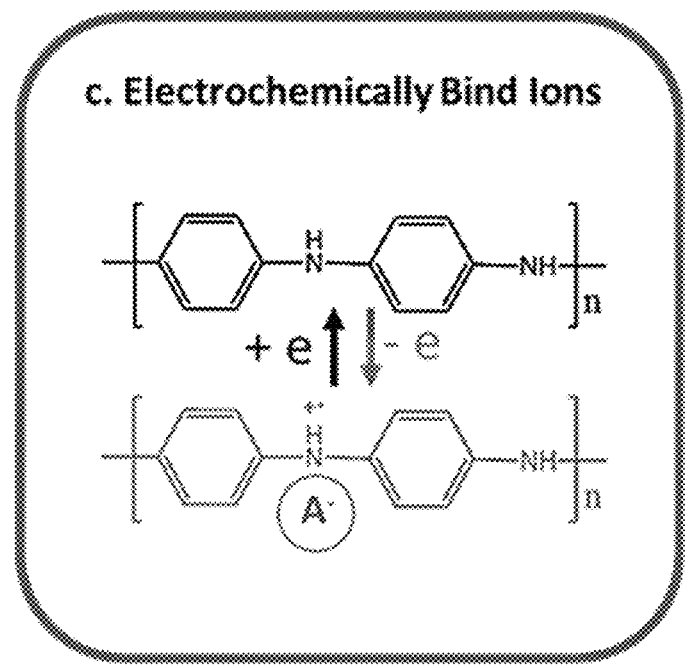
Figure 3D:
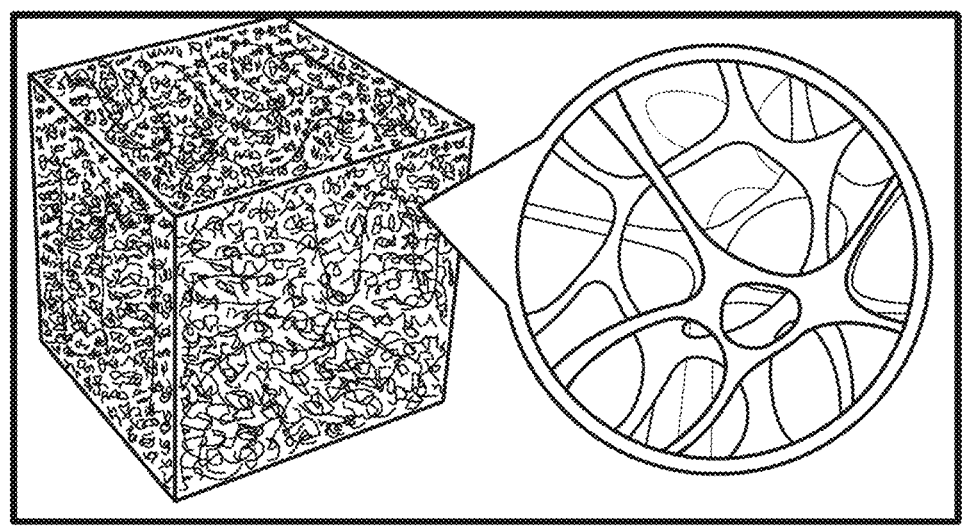
FIG. 3D illustrates the foam's structure, with the inset image illustrating a close-up of the fibers within the foam.
Figure 3E:
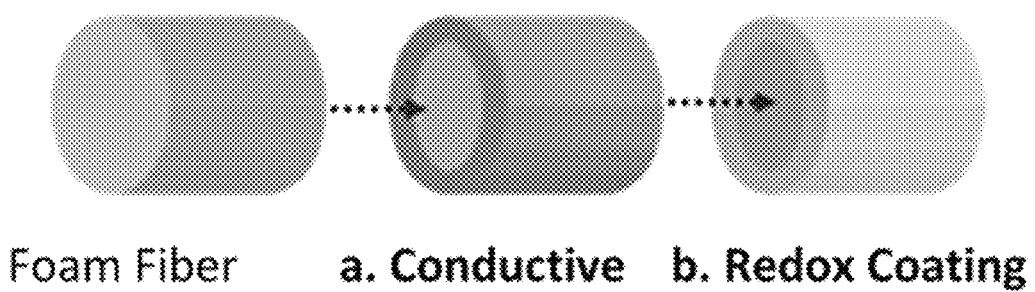
FIG. 3E illustrates the physical changes as the as the steps illustrated in FIGS. 3A-3C proceed.

Conductivity can also be introduced through electrically-conductive redox moieties. The silane-based chemistry is adaptable to tether redox-active chemical moieties, specifically designed for CDI. In one embodiment, as shown in FIG. 2, the surface chemistry of polymeric foams is modified to enable CDI to be performed on the underlying soft compressible materials. A redox moiety is linked to the base material by a silane coupler.

The base material is infiltrated with an inorganic material using a SIS process at 104. The SIS process may include exposing the foam to a first metal precursor for a first predetermined time and a first partial pressure of the first metal precursor so that the metal precursor deposits on, coats or infiltrates at least a portion of the base material (e.g., infiltrates beneath the surface of each of the plurality of strands forming the base material shown in FIGS. 3A-3E) and binds with the base material. The first predetermined time can be in the range of 0.5 seconds to 500 seconds (e.g., 0.5, 1, 5, 10, 20, 30, 40, 50, 60, 70, 80, 90, 100, 120, 140, 160, 180, 200, 220, 240, 260, 280, 300, 350, 400, 450 or 500 seconds, inclusive of all ranges and values therebetween). In some embodiments, the first predetermined time is in the range of 1 and 10 seconds, for example about 5 seconds. The first partial pressure of the first metal precursor can be in the range of 0.01 Torr to 10 Torr. (e.g., 0.01, 0.05, 0.1, 0.5, 1.0, 5.0, 10 Torr, inclusive of all ranges and values therebetween). In some embodiments, the first partial pressure of the first metal precursor is in the range of 0.1 Torr and 1 Torr, for example about 0.5 Torr.

In some embodiments, the base material can be heated to a predetermined temperature during the SIS process. For example, the first predetermined temperature can be in the range of 50-200° C. (e.g., 50, 60, 70, 80, 90, 100, 110, 120, 130, 140, 150, 160, 170, 180, 190 or 200° C., inclusive of all ranges and values therebetween). In some embodiments, the predetermined temperature is in the range of 70-90° C., for example 85° C. In some embodiments, the first predetermined temperature can be in the range of 120-140° C., for example 135° C.

In some embodiments, first metal precursor includes Trimethyl Aluminum (TMA), Triethyl Aluminum (TEA), Yttrium Tris(2,2,6,6-Tetramethyl-3,5-Heptanedionate) $(Y(thd)_3)$, Diethyl Zinc (DEZ), Titanium tetrachloride $(TiCl_4)$, Vanadium (V) Oxytriisopropoxide (VOTP), Palladium (II) hexafluoroacetylacetonate, $(Pd(hfac)_2)$, copper bis (2,2,6,6-tetramethyl-3,5-heptanedionate) $(Cu(thd)_2)$, copper (II) hexafluoroacetylacetonate hydrate $(Cu(hfac)_2)$, iron tris (2,2,6,6-tetramethyl-3,5-heptanedionate) $(Fe(thd)_3)$, cobalt tris(2,2,6,6-tetramethyl-3,5-heptanedionate) $(Co(thd)_3)$, Bis (2,2,6,6-tetramethyl-3,5-heptanedionato)barium triglyme adduct $(Ba(thd)_2.tri)$, Bis(cyclopentadienyl)ruthenium (Ru $(cp)_2$), disilane $(Si_2H_6)$, Tungsten Hexafluoride $(WF_6)$, Bis (N,N'diisopropylacetamidinato)copper(I) (Cu(DIA)), Nickel (II) acetylacetonate $(Ni(acac)_2)$, antimony pentachloride $(SbCl_5)$, niobium pentachloride $(NbCl_5)$, niobium pentethoxide $(Nb(OEt)_5)$, titanium isopropoxide $(Ti(iOPr)_4)$, tris(tetramethylcyclopentadienyl)cerium (III), cyclopentadienyl indium (InCp), tris(i-propylcyclopentadienyl)lanthanum $(La(iPrCp)_3)$, bis(cyclopentadienyl)magnesium (Mg $(Cp)_2$), bis(cyclopentadienyl)nickel $(NiCp_2)$, (trimethyl)methylcyclopentadienylplatinum (IV) $(Pt(MeCp)Me_3)$, bis(pentamethylcyclopentadienyl)strontium $(Sr(Me_5Cp)_2)$, tris (cyclopentadienyl)yttrium $(YCp_3)$, bis(cyclopentadienyl) dimethylzirconium $(ZrCp_2Me_2)$, bis (methylcyclopentadienyl)methoxymethyl zirconium (ZrOMe), tetrakis(dimethylamino)tin (TDMASn), tetrakis (dimethylamino)zirconium (TDMAZr), tris(dimethylamino) aluminum (TDMAAl), iridium(III) acetylacetonate $(Ir(acac)_3)$, niobium pentafluoride $(NbF_5)$, ferrocene $(FeCp_2)$, cyclohexadiene iron tricarbonyl $(FeHD(CO)_3)$, tetrakis(dimethylamino)antimony (TDMASb), aluminum trichloride $(AlCl_3)$, niobium (V) iodide $(NbI_5)$, tin (IV) iodide $(SnI_4)$, Tris(tetramethylcyclopentadienyl)gadolinium (III) $(Gd(Me4Cp)_3)$, Bis(pentamethylcyclopentadienyl) barium 1,2-dimethoxyethane adduct $(Ba(Me_5Cp)-2-DMA)$, Molybdenum Hexafluoride $(MoF_6)$, Tris(tert-pentoxy)silanol (TTPSi), Silicon tetrachloride $(SiCl_4)$, lithium tert-butoxide (Li(tOBu)), trimethyl indium (TMin), trimethyl gallium (TMGa), and dimethyl cadmium (TMCd), or any combination thereof.

The base material, after reaction with the first co-reactant, is then exposed to a second co-reactant precursor for a second predetermined time and a second partial pressure of the second co-reactant such that the second co-reactant precursor reacts with the first metal precursor to form the inorganic material on or within the base material. In some embodiments, the second co-reactant precursor includes water, hydrogen peroxide, nitrous oxide, oxygen, ozone, hydrogen, formaldehyde, trimethyl aluminum, ammonia, hydrazine, dimethyl hydrazine, diethyl hydrazine, methylethyl hydrazine, hydrogen sulfide, trimethyl phosphite, trimethyl phosphate, silane, disilane, or any combination thereof. For example, the first metal precursor can be trimethyl aluminum and the second co-reactant can be water. The second predetermined time can be in the range of 1 to 500 seconds (e.g., 1, 5, 10, 20, 30, 40, 50, 60, 70, 80, 90, 100, 120, 140, 160, 180, 200, 220, 240, 260, 280, 300, 350, 400, 450 or 500 seconds, inclusive of all ranges and values therebetween). In some embodiments, the second predetermined time is in the range of 1 and 10 seconds, for example about 5 seconds. The second partial pressure of the second co-reactant can be in the range of 0.01 Torr to 10 Torr. (e.g., 0.01, 0.05, 0.1, 0.5, 1.0, 5.0, 10, Torr inclusive of all ranges and values therebetween). In some embodiments, the partial pressure of the second co-reactant is in the range of 0.1 Torr and 1 Torr, for example about 0.5 Torr.

Any number of cycles of exposing the base material to the first metal precursor and the second co-reactant precursor can be performed to reach a depth within the polymer strand (e.g., the polymer strand of the base material 312) that the inorganic material has infiltrated as well as amount of inorganic material deposited therein. In some embodiments, the number of cycles of the SIS process can be in the range of 1-50, (e.g., 1 cycle, 2, 3, 4, 5, 10, 15, 20, 25, 30, 35, 40, 45 or 50 cycles, inclusive of all ranges and values therebetween). In some embodiments, 1 to 5 cycles of the SIS process are used to form a desired thickness of the inorganic material on the base material.

In some embodiments, the inorganic material formed on the base material and deposited on or infiltrating at least the portion of the base material includes a metal, a metal oxide, a metal nitride, a metal sulfide, metal chalcogenide, a metal carbide, a metal phosphide, or any combination thereof. For example, the inorganic material can include $Al_2O_3$, $TiO_2$, ZnO, MgO, $SiO_2$, $HfO_2$, $ZrO_2$, W, or any combination thereof. In some embodiments, the first metal precursor includes TMA and the second co-reactant precursor includes water or ozone. In such embodiments, the inorganic material coated on and infiltrating at least a portion of the base material includes $Al_2O_3$.

In general, the SIS process involves exposing a substrate (e.g., the base material), which can be formed from an organic material, to various gas phase precursors (e.g., the first metal precursor and the second co-reactant precursor) to synthesize the inorganic material, similar to ALD. However, contrary to other deposition methods, such as ALD, which only forms the inorganic material on a surface of the substrate, SIS coats the surface of the substrate but also infiltrates into the bulk substrate. This is achieved by adjusting the partial pressure and time of the gas phase precursor exposures (i.e., the first metal precursor and the second co-reactant precursor).

In some embodiments, the SIS process may include relatively long periods of gas phase exposure and high partial pressure of the first metal precursor and the second co-reactant precursor. For example, the SIS method may include a relatively long period of gas phase exposure and high partial pressure of the first metal precursor followed by a long period of exposure and high partial pressure of the second co-reactant precursor. In various embodiments, a purging step can be performed in-between exposure to the first metal precursor and the second co-reactant precursor.

For example, the base material can be positioned in a hermetically sealed chamber pumped to vacuum. The base material is exposed to the first metal precursor for the first predetermined time (e.g., between 1 second and 500 seconds) and the first partial pressure (e.g., between 0.01 Torr and 10 Torr). The chamber is then evacuated and/or purged with an inert gas (e.g., nitrogen, argon, or any other inert gas) before exposing the base material to the second co-reactant component. In another embodiment, the method may include a series of short pulses of the first metal precursor followed by another series of short pulses of the second co-reactant precursor. In some embodiments, a series of short pulses may be combined with long periods of gas phase exposure to the first metal precursor and/or the second co-reactant precursor.

In some embodiments, the total time of exposure to first metal precursor and/or the second co-reactant precursor during SIS cycle may be 5 to 1000 times higher, and the partial pressures may be 5 to 10,000 times larger than the typical time and partial pressure for an ALD cycle.

The first metal precursor infiltrates within the base material and selectively binds (either covalently or non-covalently) to a functional group of the base material (e.g., a carbonyl group). The second co-reactant precursor is selectively reactive with the first metal precursor that is bound to the base material. For example, the first reactive gas may be a ligated metal, such as a transition metal organic, and the second reactive gas may be water. In some embodiments, a third precursor may be used. For example, a dopant can be deposited either as less than a single atomic layer (ad-islands or particles) or as a dopant layer, such as to alter conductivity or magnetic properties.

The SIS process results in the growth of the inorganic material in a sub-surface region of the base material associated with the first metal precursor and the second co-reactant precursor used as well as, in some embodiments, on the surface of the base material. In some embodiments, the inorganic material can form an inorganic layer that may have a thickness in the range of 0.2 nm to 5,000 nm. For example, the inorganic material can include aluminum oxide ($Al_2O_3$), which may be formed within and/or on the base material using TMA as the first metal precursor and water as the second co-reactant precursor. In some embodiments, the inorganic material can infiltrate the base material via SIS so as to infuse the base material polymer with the inorganic material to a depth of 0.05 micron to 1,000 microns.

In some embodiments, the base material forming the foam includes polyurethane, having the chemical structure shown below:

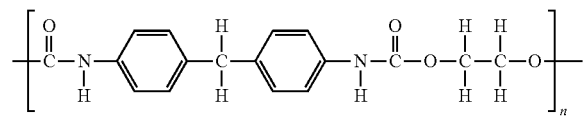

During the first phase of the ALD or SIS process, the polyurethane is exposed to TMA as the first metal precursor, which reacts with the carbonyl moieties in the polyurethane as shown by the following reaction:

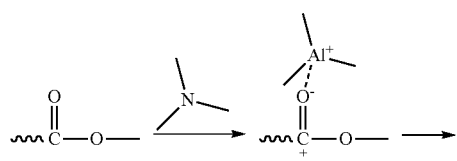

-continued

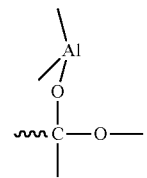

During the second phase of the ALD, molecular layer deposition (MLD), or SIS process, the second co-reactant precursor, for example water reacts with the first precursor coupled to the carbonyl bonds of the polyurethane to form $Al_2O_3$ on the polyurethane. The $Al_2O_3$ or any other inorganic material deposited on the base material serves as a linker for coupling of an oleophilic material thereto, as described herein.

In some embodiments, the first metal precursor (e.g., TMA) selectively binds with carbonyl moieties present in the base substrate. In other embodiments, any other polymer component or reactive functional groups of the base material may be utilized for selective inorganic material. For example, the first metal precursor may be formulated to interact with various functional groups of the base material through various interactions, including metal-ligand coordination, covalent bonding, and other interactions. For example, in various embodiments the base material may include pyridine groups, which can be used to selectively bind various metal compounds (including $Al(CH_3)_3$, $AlCl_3$, $ZnCl_2$, $CdCl_2$, etc.), which may be used as the first metal precursor. In some embodiments, the base material can include hydroxyl groups, which can react with various first metal precursors (including $Al(CH_3)_3$, $TiCl_4$, $Zn(C_2H_5)_2$, etc.) to form covalent bonds.

Two components may be significant in driving the ALD, MLD, or SIS process to obtain particular characteristics of the inorganic material formed on the base material. The first component is the selective and self-limited reaction of the first metal precursor (such as TMA, $TiCl_4$, $SnCl_4$, $AlCl_3$, $Al(CH_3)_3$, etc.), which are Lewis acids in this example, and the second component is the second co-reactant precursor strategically selected functional moieties in the base material such as the carbonyl groups in polyurethane. Once bound to the polymer, the grafted metal-ligands serve as nucleation sites for the second co-reactant precursor. Within each of these components, the reactions are controllable on the molecular level and the characteristic self-limited heterogeneous reactions provide macroscopic uniformity.

The order of the precursors may be altered in various embodiments. For instance, in some embodiments the second co-reactant precursor (e.g., $H_2O$, $H_2S$) can be selected to react with or bind to a specific functional group in the base material and utilized first in the ALD, MLD, and/or SIS sequence, and the first metal precursor can be utilized next in the ALD, MLD, and/or SIS sequence so as to react with the adsorbed or bound second co-reactant precursor.

With the conductive inorganic material infiltrated into the base material, the foam is further functionalized with materials for increased electrode capacitance. Silane coupling agents have the ability to form a durable (covalent) bond between organic and inorganic materials. Surfaces modified in this way can be used to generate desired chemical environments on demand, wherein surface functionality is selectively chosen. Factors influencing silane surface modification include the number (concentration) of surface hydroxyl groups and physical dimensions of the subtracted or substrate features.

In one embodiment, silanization reactions are used to introduce surface functionality (FIG. 2B) informed by materials for high-rate electrochemical supercapacitors. The faradaic surface redox reactions provided by these materials will increase the electrode capacitance and enhance desalination efficiency over existing carbon electrodes used in CDI. Increasing the capacitance of CDI electrodes lowers the necessary potential needed to desalinate an equivalent amount of water and thereby reduces cost and energy consumption.

One embodiment chemically anchors functionalized moieties to the surface of the ALD-modified substrates through silane-based chemistries. A general scheme is shown in FIG. 1. At step 102, a foam comprising a base material is provided. At step 104, the base material is coated with an inorganic material by SIS. At step 106, the coated base material is then functionalized with a silane coupler bound or otherwise engaged to the inorganic material. At step 108, a conductive material is coupled to the base material by the silane coupler, providing a conductive foam.

In a particular set of embodiments, a series of CDI-capable chemistries based on conjugated amine functionalities are used. This particular set of embodiments can be used in two distinctive ways: (i) the amine functionality (and corresponding negative charge) is used to adsorb ions itself and (ii) the amine functionality can be electrochemically polymerized to create thicker films. For the first, the general requirement is to adsorb ions, and so any charged species and/or or any species that becomes charged under the application of voltage can be used. In this way, other embodiments include other charged groups (carboxyl, etc.) and/or materials coatings that mimic those currently used in CDI (e.g., carbon foams, activated carbons (ACs), activated carbon fibers (ACFs), templated nanoporous carbons, carbon aerogels, carbon nanotubes (CNTs), carbon nanofibers (CNFs) and graphene). In one example, the functionalization is based on N-triethoxysilyl reactions (e.g., N-triethoxysilyl(aniline) and N-triethoxysilyl(pyrrole)). After initial nucleation, these surface monomers can be electrochemically polymerized to generate thicker polymer films. Thicker polymer films would provide increased ion uptake capacity. There are numerous synthetic chemical groups that will form chemical bonds with primary amines. These include isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters. Most of these conjugate to amines by either acylation or alkylation. Polymerization can proceed using chemical groups and polymerization or cross-linking promotors as understood to achieve a desired polymer thickness or polymer with other preferred properties.

The base material can be exposed to the silane material using any suitable method. In some embodiments, the CDI material is deposited using a liquid phase method, for example by immersing the foam comprising the base material coated with the inorganic material in a liquid silane material or in a liquid solution of the silane material dissolved in a solvent (e.g., ethanol). In some embodiments, the foam can be exposed to a vapor of a volatile silane. For example, the foam coated with or infiltrated with the inorganic material can be functionalized with the silane material using a single-step vapor phase process.

In some embodiments, an ALD process can be used to coat the foam with the silane material. For example, the foam, including the base material (e.g., polyurethane) coated with an inorganic material (e.g., $Al_2O_3$), is subjected to one or more ALD cycles comprised of an exposure to the silane material (e.g., N-triethoxysilyl(aniline) or N-triethoxysilyl (pyrrole)), optionally followed by an exposure to a co-reactant (e.g., water). The silane material can covalently or non-covalently react with the inorganic material, for example a metal or metal oxide, so that the inorganic material is functionalized with the silane material.

The attachment of the coupling agent allows for the further alternation by additional reaction or deposition. For example, in one embodiment surface redox potential material are utilized and attached via the coupling agent to impart improved electrode properties. Compared with bulk ion insertion, materials surface redox reactions provide significant cost advantages in both cost per unit energy and power because bulk ion insertion materials require slow solid-state ion diffusion to access all of the capacity compared to having redox sites in a thin film at the electrode surface. As such, bulk ion insertion (lithium ion battery) electrodes require hours to charge, while surface redox reaction (electrochemical supercapacitor) electrodes require only seconds to charge. Furthermore, degradation is a significant problem in bulk ion insertion materials (due to mechanical expansion and contraction) leading to cycle lives of only 100s of cycles, while supercapacitor electrodes with similar composition but employing surface redox reactions have been demonstrated to be stable for >105 cycles.

Further, certain embodiments relate to particular processes and CDI constructs that can mitigate many of the potential problems associated with CDIs in general and specifically using the redox reaction materials described herein. While these alterations to particular steps in the process or resultant materials are described individually, they be combined in various combinations so long as not incompatible.

In one embodiment, surface redox ligands are utilized to impart conductivity to the foam. In one embodiment, silanation is enhanced by use of (3-Aminopropyl)triethoxysilane (APTES) with organic reactions to provide functional groups for reaction with silane, such as aniline and pyrrole.

In one embodiment, the surface redox ligands have polymer chains with a length. The surface redox ligand may be extended through further polymerization to achieve a desired polymer length and/or thickness. Longer polymer chains and thicker polymer films would provide increased ion uptake capacity because of the increase in number of available binding sites. It may also be possible introduce cooperative binding effects between different polymer segments. Typical scaling arguments for polymer chains list a radius of gyration equal to the molecular weight of the polymer raised to ¾.

The redox ligands are selected so as to bind ions upon the application of an electrical bias. The ion binds based on the redox activity of the functional group—such as viologen, polyaniline, polypyrrole, and ligands based on conducting polymers. The range of biases preferred are as follows: (1) the redox potential of each ligand must be within the stability limits of water; (2) for a device aimed only for desalination, the redox potential of both electrodes should be equivalent, so that a minimal potential is required to drive desalination and regeneration; and (3) for a device which integrates desalination and energy storage, the potential difference between the two electrodes should be maximized (still within the limits of water splitting) to allow for maximal energy storage. Furthermore, redox potentials can be selected such that (i) fresh water is generated during charging and/or (ii) fresh water is generated during discharging.

In one embodiment, the electrodes may be functionalized so as to provide ion selectivity. For example, the positive electrode may be functionalized with one material and the negative electrode may be functionalized with another material. As one non-limiting example, polyaniline may be used on one electrode and polypyrrole used on the other electrode.

The infiltration step (SIS) may be tailored based on the foam's properties (e.g., polymer content and diameter of individual polymer strands in the foam) and the material being infiltrated into the foam. The void volume of the foam can be adjusted such that the amount of ions bound to ligands on the internal surface area is commensurate with the amount of ions in the volume of water contained within the void volume of the foam.

In one embodiment, a conductive carbon material may be integrated with the foam. It is believed the conductive carbon will impart stability under repeated compression cycles. Conductive carbon can be introduced using a slurry of solvent, carbon, and binder which is injected into the foam, and upon drying, provides a conductive network within the foam.

CDI performance is limited by low capacity and slow ion transport in existing electrodes. Existing electrodes are composed of high surface area carbon with a specific capacitance of 10-100 F/g. These high surface area (>1000 $m^2$/g) carbon electrodes aim to maximize ion adsorption, but at the expense of rate limitations—high tortuosity and low void volume (porosity) introduce ohmic and diffusion losses from restricted transport. More porous electrodes provide open paths for ion transport but also increase transport lengthscales. By generating compressible porous electrodes, the liquid volume can be exchanged from the electrode through mechanical compression by a compression mechanism—like wringing out a sponge—to improve transport. This provides a path to engineer electrodes which strike a balance between ion uptake capacity and porosity for improved efficiency, a critical need for CDI. In one embodiment, steps of desalination and regeneration are used where waste salt water produced from regeneration is collected/discarded in the regeneration step, and fresh water is collected for use in the desalination step. This is a semi-batch mode where water is continuously supplied.

A CDI apparatus in one embodiment relies upon compression/decompression cycles of the foam to control convective flow into and out of the foam's internal void volume, enhancing ion adsorption through convection rather than relying on diffusion. This will enable the device to exceed the charging rates of incompressible electrodes where ions must diffuse through tortuous paths in the electrode. This will also enable separation of form from function in engineering electrodes. Foams with a range of porosity, density, and surface area are commercially available, allowing the microstructure of the electrode to be changed simply by using foams with different properties. For any foam, one can set the surface chemistry using SIS and then follow up with silanization reactions to introduce functional groups designed to remove ions from water with high capacity and selectivity. Similar to chemical modification of the foam surfaces, both the frequency and amplitude of the compression/decompression cycles can be selected to provide the desired response of the CDI elements. These features include adjusting the frequency and amplitude of the compression/decompression cycle in order to meet operational considerations, such as high flow rate applications where short repeated cycling may be preferred to capture as many ions as possible while ensuring adequate or desired flow.

Similarly, for water salinity conditions, where conditions of high salt concentration may benefit from large amplitude, highly compressed states at large frequency. These two examples highlight some different conditions which may necessitate one state or mode of operation over the other and are intended to include other related features, such as differences in solution viscosity where it may be energetically favorable to compress slowly.

In all cases, the actual effect of compression/decompression is to change the pore size and void volume from their nominal values in the uncompressed state to much smaller values in the compressed state to overcome diffusion limitations and thus capture as many ions as possible as quickly as possible. While the extreme limit (completely compressed) may be advantageous from a theoretical point of view to minimize diffusion length and time scales, there is a relative tradeoff between operational (e.g., flow rate) and environmental conditions (e.g., salinity, viscosity), which may necessitate one set of conditions over the other. In this way, embodiments described herein can achieve a solution that is based on the nature of compression/decompression as well as tuning.

It is important to emphasize that compression/decompression is inherently controlled by appropriate foam material properties (e.g., flexibility (to minimize the energy expenditure), and initial surface area/pore structure). If, for example, short quick compression cycles are required, a flexible foam will minimize energy expenditure. However, if large amplitude and slow compression cycles are required, stiffer variants can be accommodated at fixed energy, which may allow for a better selection of surface are to void volume ratios. In this way there is a relative tradeoff, and these features get to the heart of why this invention is an important change in current CDI configurations—there are numerous tradeoffs to running in one state versus another, and balancing these effects to, for example, minimize energy input during operation and/or ensure high salinity feeds can be targeted is only possible because of these "modalities" of the embodiments described herein.

In this way, compression/decompression is used to similarly to the chemical control over foam chemistry and is selectively chosen so as to optimize response. Such features take on different forms depending on the conditions of operation and what exactly the target is (e.g. brackish water versus ocean water), and this invention makes specific use of the fact that everything can be modular (e.g., foam format, porosity, surface chemistry, and mechanical compression/decompression cycles) in order to optimize the desired configuration depending on environmental conditions, etc.

The use of a compression and/or decompression cycle in the CDI apparatus with foam electrodes allows the foam to have a higher effective surface area, and thus adsorption rate, while providing a higher flow-through than would be possible with a passive flow of fluid. In essence, the compression and decompression serve to compensate for the more difficult path through the foam. The CDI apparatus uses the void volume of the foam in the uncompressed state to flow liquids through it while the compressed state is used to enhance desalination by limiting the diffusion pathways for the ions to find an adsorption surface. The compression mechanism may be a single item or opposing items that work alone or in unison, such as rollers, pistons, presses or the like.

Figure 4:
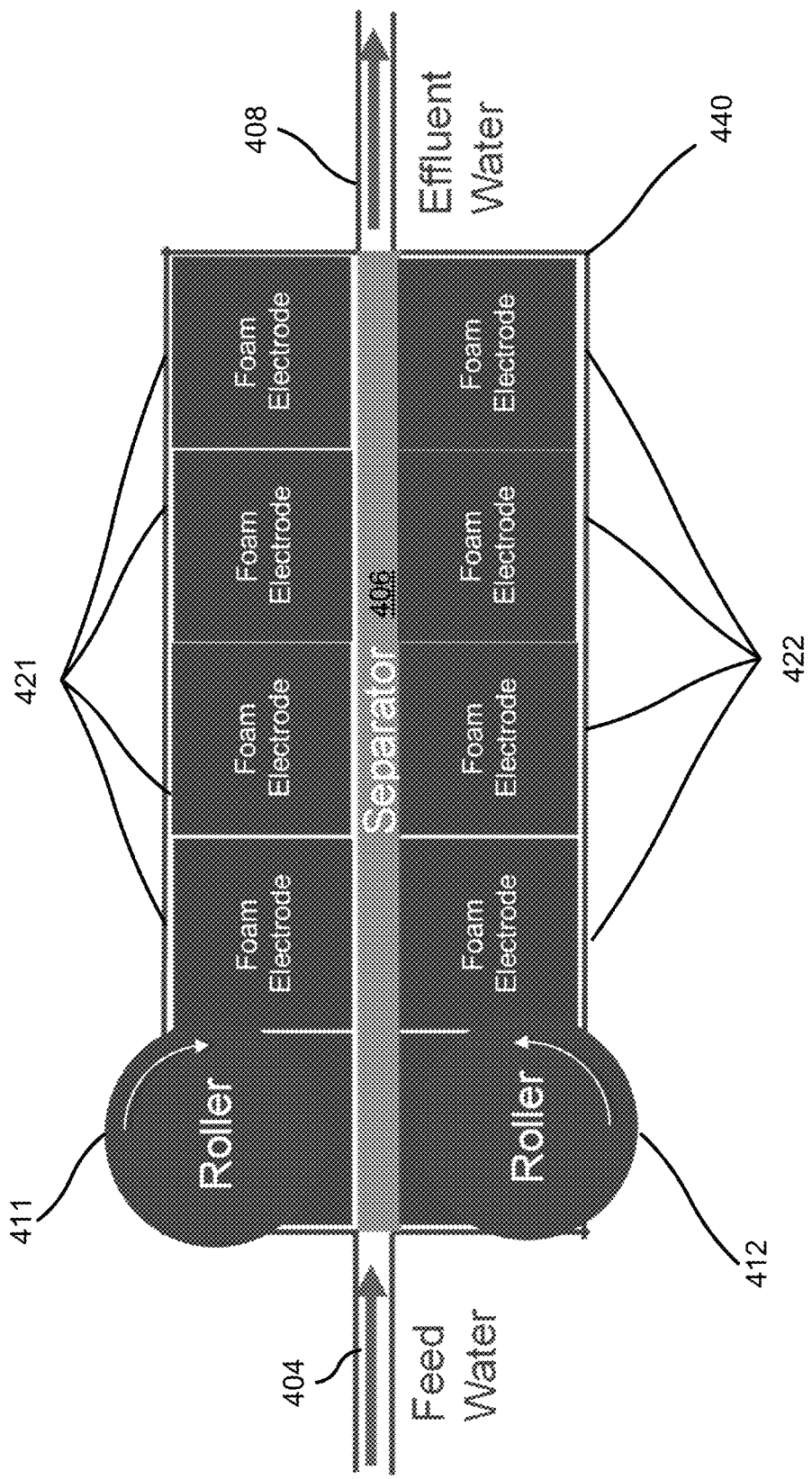
FIG. 4 illustrates a schematic of roller device for operation of compressible foam electrodes with enhanced mass transport.

In FIG. 4, a device schematic 400 is depicted in which foam electrodes 421/422 are used for water treatment/desalination with mechanical compression. In this diagram, water flows in through a water feed inlet 404 on the left, enters a separator material 406 and fills the void volume of the porous foam electrodes 421/422 before exiting out the effluent output 408 on the right. In some embodiments, the form factor and additional components are shared with non-compressible foam CDI cells such as choice of separator material (e.g. filter paper (FP), CNT, stainless steel fibers (SSF), and others employed previously). Similarly, there are configurations in which ion-permeable membranes can be positioned to selectively seal each of the opposing foam electrodes with the brackish water flowing in a passage defined between the seals rather than through "separator material." The foam electrodes 421/422 may comprise opposing sets of upper electrodes 421 and lower electrodes 422 to facilitate exerting opposing force to "squeeze" the foam electrodes. The opposing (relative to the separator 406) electrodes are oppositely charged, though it will be appreciated that the position of the positive electrode and the negative electrode may be swapped in various embodiments. The separator 406 is electrically insulating and prevents electrical contact between the opposite foam electrodes 421/422 but allows transport of water to the foam electrodes (e.g., through holes or pores) and of ions through the electrodes, such as to charge collector plates associated with the electrodes.

A vessel/container 440 holding the foam electrodes 421/422 is compressible, comprised, for example, of a thin plastic sheeting, to allow for mechanical compression of the foam electrodes within the chamber. In the embodiment shown in FIG. 4, the compression mechanism includes opposed rollers 411/412 that are rolled over the compressible container 440 to mechanically squeegee the water out of the foam electrodes to increase the rate of mass transport. Other alternative mechanical means may be used to controllably compress the electrodes 421/422. The foam electrodes 421/422 can either be loose in the device, or affixed to either or both of the separator and container wall to allow for forced expansion. An electrically conducting chamber walls (e.g., conducting polymer or thin metal sheeting) can be used to make electrical contact to the foam electrodes, and are used to charge and discharge the foam electrodes, such as by providing a plate or substrate between the container 440 and the electrodes 421 and/or the container 440 and electrodes 422, preferably opposite from the separator 406. This can provide a charge collection function to the CDI. The rollers 411/412 can pass at various rates in/out of sync with the charging and discharging of foam electrodes 421/422.

Figure 5B:
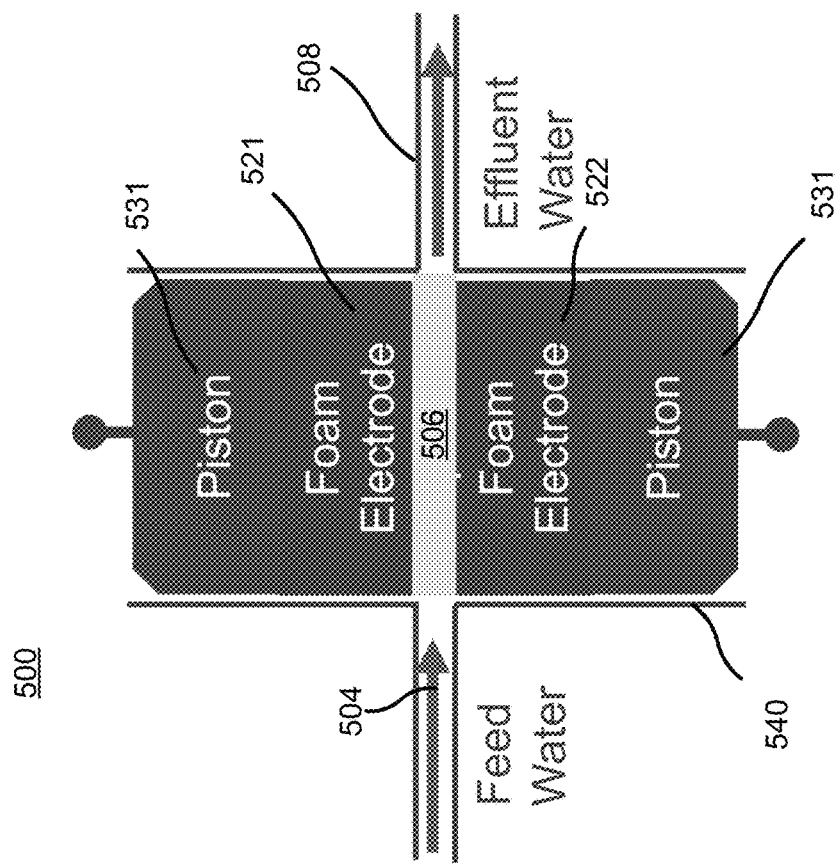
FIGS. 5A-5B illustrate a schematic of piston device for operation of compressible foam electrodes with enhanced mass transport.
Figure 5A:
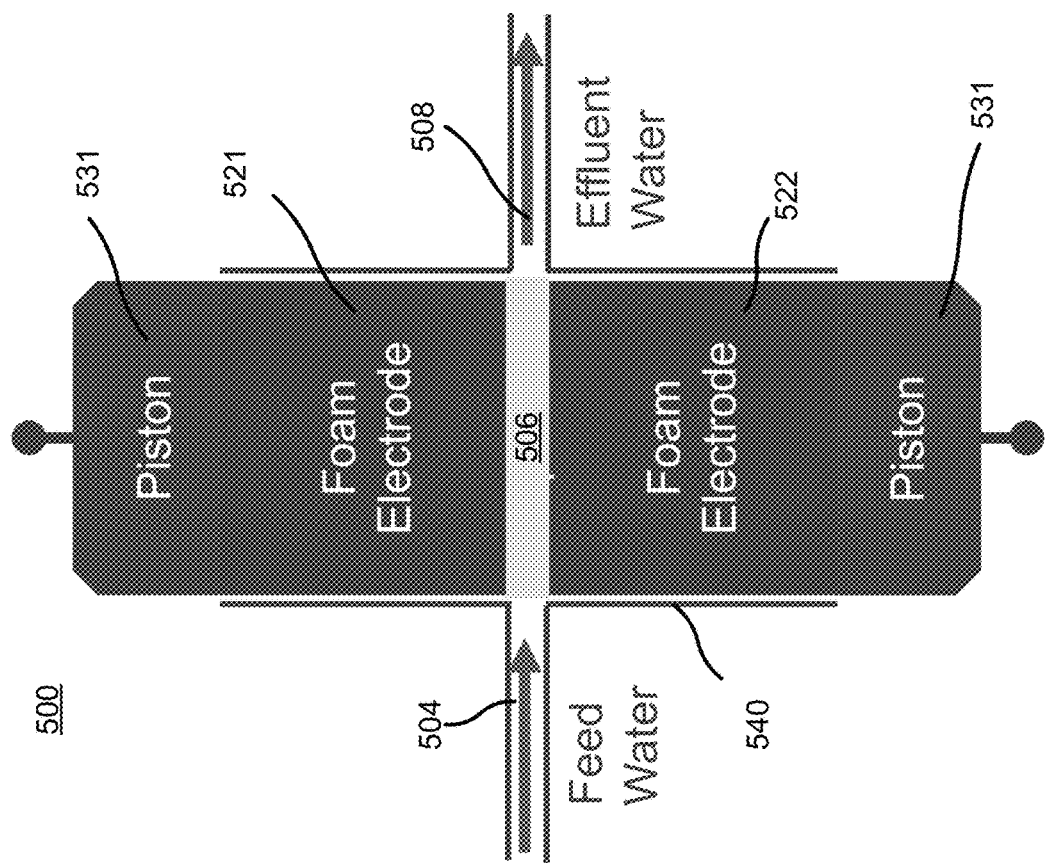

FIGS. 5A-5B show device schematics 500 in which foam electrodes 521/522 are used for water treatment/desalination with mechanical compression. In these diagrams, water flows in through a water feed inlet 504 on the left, enters a separator material 506 and fills the void volume of the porous foam electrodes 521/522 before exiting out the effluent output 508 on the right. The foam electrodes 521/522 may comprise opposing sets of upper electrodes 521 and lower electrodes 522 to facilitate exerting opposing force to "press" the foam electrodes against the separator 506. The opposing (relative to the separator 506) electrodes 521/522 are oppositely charged, though it will be appreciated that the position of the positive electrode 521 and the negative electrode 522 may be swapped in various embodiments. The separator 506 is electrically insulating and prevents electrical contact between the two foam electrodes 521/522 but allows transport of water to the foam electrodes 521/522 (e.g., through holes or pores). One or more pistons 531/532 are mechanically actuated and used to compress and expand the foam electrodes. These pistons 531/532 are hermetically sealed such that water cannot flow past them out of the device. The foam electrodes 521/522 can either be loose in the device or affixed to either or both of the separator 506 and respective pistons 531/532 to allow for forced expansion and compression. The pistons 531/532 and/or chamber walls 540 can be used to make electrical contact to the foam electrodes 531/532, and are used to charge and discharge the foam electrodes. The pistons can be actuated at various rates in/out of synch with the charging and discharging of foam electrodes.

Described herein are embodiments for a balanced and improved performance as between salt adsorption capacity and flow-through rate. For example, high surface area materials (>1000 $m^2$/g) are usually preferred. However, there is a relative tradeoff with ensuring high throughput, as determined by the salt adsorption rate (adsorption per time unit), which in turn depends on the system setup (electrode/foam thickness, the diameter of the flow channel, the applied voltage, and number of adsorption/desorption cycles) as well as the electrode architecture. In typical operation in current cells, close to full saturation is achievable in a matter of a few minutes.

One implementation uses ZnO thin films grown by ALD/SIS to render foams electrically conductive (FIG. 2A) and uses triethoxysilyl functionalized redox moieties to bind with ZnO films and introduce redox functionality (FIG. 2B). In a first step, ZnO is introduced in an atomically controlled fashion to a desired thickness (e.g., 0.2 nm-10 nm) by ALD/SIS. The resulting thickness will determine certain attributes of the film, e.g., cracking during compression cycles can be prevented by ensuring a sufficiently thin (~1 nm) thickness. In a subsequent step, functionalized redox moieties will be introduced. Specifically, we will introduce polyaniline and polypyrrole monomers using triethoxysilyl (R—Si(OEt)3) functionalized monomers.

As used herein, the singular forms "a," "an," and "the" include plural referents unless the context clearly dictates otherwise. Thus, for example, the term "a member" is intended to mean a single member or a combination of members, "a material" is intended to mean one or more materials or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present disclosure.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the disclosure have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A capacitive deionization apparatus comprising:
   a first foam electrode;
   a second foam electrode;
   a compressible container having the first foam electrode and the second foam electrode disposed therein;
   a separator positioned between the first foam electrode and the second foam electrode;
   a water feed inlet and an effluent water outlet associated with the separator; and
   a compression mechanism for controllably compressing at least one of the first foam electrode and the second foam electrode.

2. The apparatus of claim 1, further comprising a first conductive plate between the first foam electrode and the housing and a second conductive plate between the second foam electrode and the housing.

3. The apparatus of claim 1, wherein the first foam electrode comprises a plurality of first electrodes.

4. The apparatus of claim 3 wherein the second foam electrode comprises a plurality of second electrodes.

5. The apparatus of claim 1, wherein the compression mechanism comprises a first roller and a second roller opposed to the first roller.

6. The apparatus of claim 1 wherein the compression mechanism comprises a first piston associated with the first foam electrode and a second piston associated with the second foam electrode.

7. The apparatus of claim 1, further comprising a conductive carbon integrated into at least one of the first foam electrode and the second foam electrode.

8. The apparatus of claim 7 wherein the conductive carbon forms a conductive network with binders and the first foam electrode.

9. The apparatus of claim 1 wherein the separator is configured for the flow of liquid from the water feed inlet to the water feed outlet, the separator in fluid communication with the first foam electrode and the second foam electrode, with the first foam electrode and the second foam electrode being electrically isolated from each other.

10. A capacitive deionization apparatus comprising:
    a first plurality of foam electrodes;
    a second plurality of foam electrodes;
    a separator positioned between the first plurality of foam electrodes and the second plurality of foam electrodes;
    a water feed inlet and an effluent water outlet associated with the separator; and
    a compression mechanism for controllably compressing at least one of the plurality of foam electrodes and the second plurality of foam electrodes.

11. The apparatus of claim 10, further comprising a compressible housing disposed about the first plurality of foam electrodes and the second plurality of foam electrodes.

12. The apparatus of claim 10, further comprising a first conductive plate between the first plurality of foam electrodes and the housing and a second conductive plate between the second plurality of foam electrodes and housing.

13. The apparatus of claim 10, wherein the compression mechanism comprises a first roller and a second roller opposed to the first roller.

14. The apparatus of claim 10 wherein the compression mechanism comprises a first piston associated with the first plurality of foam electrodes and a second piston associated with the second plurality of foam electrodes.

15. The apparatus of claim 10, further comprising a conductive carbon integrated into at least one of the first plurality of foam electrodes and the second plurality of foam electrodes.

16. The apparatus of claim 15 wherein the conductive carbon forms a conductive network with binders and the first plurality of foam electrodes.

17. The apparatus of claim 10 wherein the separator is configured for the flow of liquid from the water feed inlet to the water feed outlet, the separator in fluid communication with the first plurality of foam electrodes and the plurality of foam electrodes, with the first plurality of foam electrodes and the second plurality of foam electrodes being electrically isolated from each other.

18. A capacitive deionization apparatus comprising:
    a first foam electrode;
    a second foam electrode;
    a separator positioned between the first foam electrode and the second foam electrode;
    a water feed inlet and an effluent water outlet associated with the separator; and
    a compression device selected from fa) a first roller and a second roller opposed to the first roller, and (b) a first piston associated with the first foam electrode and a second piston associated with the second foam electrode.

19. The apparatus of claim 18, further comprising a conductive carbon integrated into at least one of the first foam electrode and the second foam electrode.

* * * * *